No. 749,192. Patented January 12, 1904.

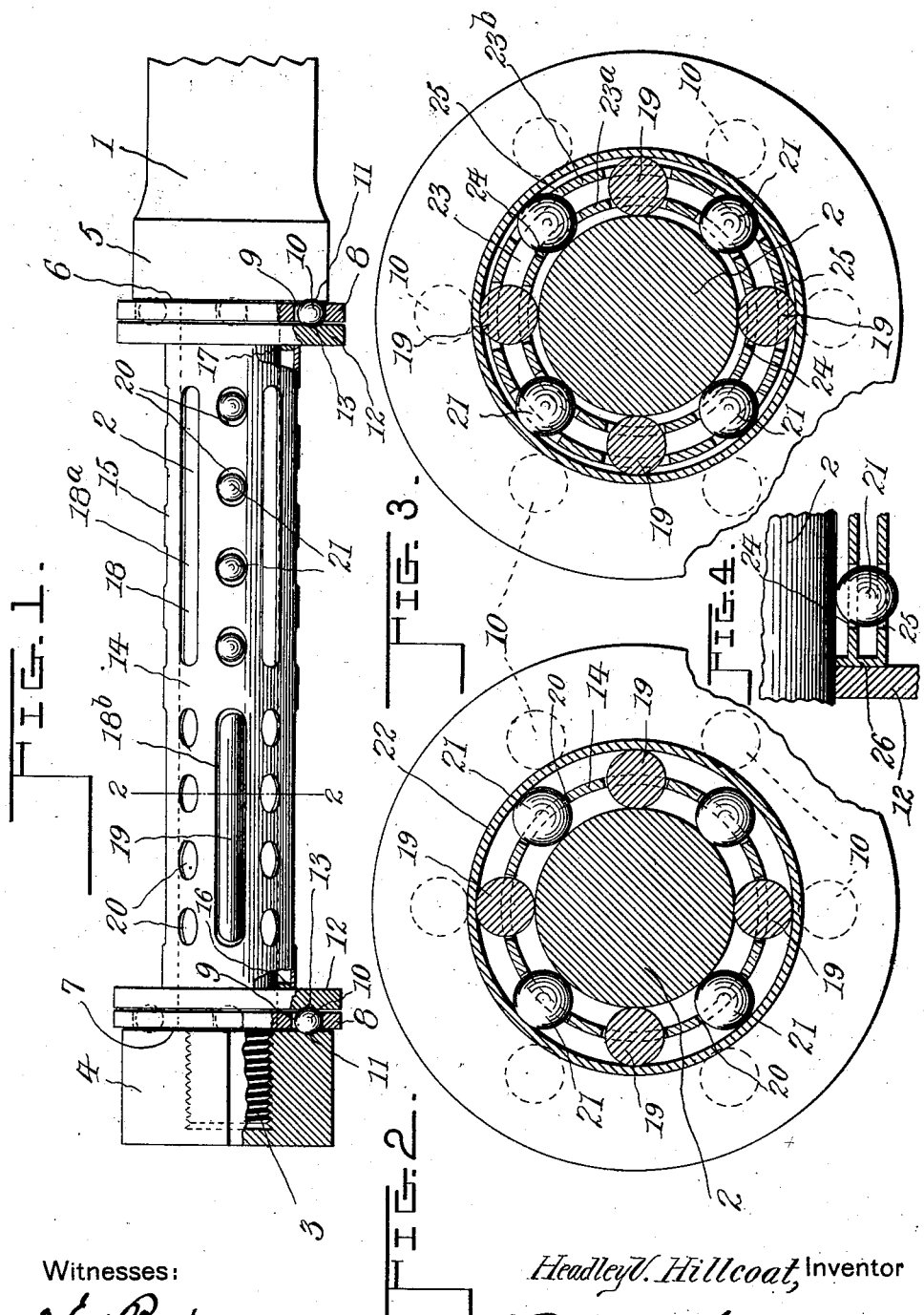

UNITED STATES PATENT OFFICE.

HEADLEY V. HILLCOAT, OF AMHERST, CANADA.

COMBINATION BALL AND ROLLER BEARING.

SPECIFICATION forming part of Letters Patent No. 749,192, dated January 12, 1904.

Application filed June 20, 1903. Serial No. 162,379. (No model.)

*To all whom it may concern:*

Be it known that I, HEADLEY V. HILLCOAT, a subject of the King of Great Britain, residing at Amherst, in the county of Cumberland, in the Province of Nova Scotia, in the Dominion of Canada, have invented certain new and useful Improvements in Combination Ball and Roller Bearings; and I do hereby declare that the following is a full, clear, and exact description of the invention, such as will enable others skilled in the art to which it appertains to make and use the same.

My invention relates to bearings; and my object is to provide an antifriction-bearing which is of simple construction and readily adapted to be used in various connections, such as for thrust-blocks and tail-bearings for steamships, wagon-axles, railway journal-boxes for cars, and bicycle-bearings, and in other connections where a serviceable and durable bearing must be obtained which will offer little resistance to the rotation of the parts.

In its construction the invention comprises an inner spindle or axle of cylindrical form and an inclosing member, also of cylindrical form, and between these members there is disposed a floating member which is not connected with the other parts, also of cylindrical form and of a diameter intermediate between that of the inner and the outer member. This floating member is provided with openings which receive balls or rollers which lie in the been applied. In this view, which is substantially a side elevation with the outer member referred to above removed, certain parts have been broken away and shown in section, as will appear. In this view many of the openings for the balls or rollers are represented as though the same had been removed. This view is upon a reduced scale. Fig. 2 is a transverse section of Fig. 1, taken substantially on the line 2 2, and in this view the outer inclosing member is represented also. Fig. 3 is a transverse section of a bearing similar to Fig. 2; but this view represents a modified construction which is adopted for the bearing where the weight or lateral stress sustained by the bearing is very great. Fig. 4 represents in longitudinal section a portion of the bearing shown in Fig. 3.

Throughout the drawings and specification the same numerals of reference denote like parts.

Referring more particularly to the parts, 1 represents an axle of a vehicle, which terminates in an arm or spindle 2, beyond which spindle there is a reduced extension 3, which is threaded, as shown, and adapted to receive a nut 4. At the inner extremity of the spindle 2 there is provided the usual head or enlargement 5, and this head comprises a laterally-disposed face 6. Lying adjacent to this face 6 and the inner face 7 of the nut 4 there vided a floating sleeve 14, which consists of a cylindrical member of comparatively thin metal and the extremities whereof are adapted to abut against the inner faces of the collars 12. In its construction this floating sleeve comprises a cylindrical body 15, within the extremities of which annular heads 16 are placed, which heads have openings 17 formed therein adapted to receive the said spindle 2, and these openings are of somewhat greater diameter than the spindle 2, as will be readily understood. These heads 16 present their outer faces to the outer faces of the aforesaid collars 12.

The floating sleeve 14 aforesaid is provided with a plurality of longitudinal openings 18, which are disposed in the lateral surface thereof, and these openings are preferably arranged an equal distance apart circumferentially. These openings are preferably arranged in two sets, these sets being arranged, respectively, adjacent to one end of the bearing. Furthermore, these sets of openings are arranged in staggered relation with respect to each other, and the openings $18^a$, which are adjacent to the inner extremity of the bearing, are disposed circumferentially between the openings $18^b$, which are adjacent to the outer extremity of the bearing. These openings are adapted to receive rollers 19. The said floating sleeve is provided also with oval openings 20, which are arranged upon the sleeve in a manner similar to that described in connection with the openings 18 for the rollers. These openings 20 are disposed, preferably, an equal distance apart measuring longitudinally of the bearing and are also slightly elongated in the same direction. These openings are adapted to receive balls 21 in the manner indicated. Between the inner faces of the collars 12 aforesaid and enveloping the spindle and the floating sleeve, together with the rollers and balls, there is provided an outer sleeve or hub-sleeve 22, which, as shown, consists substantially of a cylindrical member adapted to constitute the sleeve for the hub of a wheel.

It should appear from an inspection of Fig. 2 that the floating sleeve is disposed substantially midway between the outer surface of the spindle 2 and the outer sleeve 22, so that the openings 18 and 20, which retain, respectively, the rollers and balls, lie substantially upon the diameters of the same. Where the bearing is expected to sustain great lateral pressure, it is preferred to adopt the form shown in Fig. 3. With this form the construction at the ends of the bearing is the same as before. The floating sleeve 23, however, with this form comprises an inner sleeve $23^a$ and an outer sleeve $23^b$, and through these sleeves are formed, respectively, the openings 24 and 25, which are in substantial alinement with each other and are adapted to retain the balls and rollers in the manner indicated, it being understood that the openings for the rollers will be of the same form as the openings 18 and 19 described above. The two sleeves $23^a$ and $23^b$ unite at their extremities with annular heads, one of which is indicated at 26 in Fig. 4. The functions of these heads 26 are substantially the same as those of the heads 16 aforesaid.

In the manner described a very efficient and durable bearing is produced which is adapted to be used in all possible situations where a rotatable member is to be supported. The bearing constitutes in reality a combination of a roller-bearing and ball-bearing and combines in a great measure the valuable properties of both these types of bearings. The construction of the parts is well adapted for changing or renewing the same where the parts have become worn from use. The oval form which was mentioned in connection with the openings 20 operates to permit a certain lateral movement of the balls within their bearings, as will be readily understood.

It is expected that bearings of this form will be especially useful in connection with the thrust-blocks or thrust-bearings used upon ships propelled by a screw-propeller and also in connection with the bearings for the line-shafting for ships of this kind.

While I have shown in the accompanying drawings the preferred form of my invention, it will be readily understood that I do not limit myself to the precise form shown, for many of the details may be changed in form or position without affecting the operativeness or utility of my invention, and I therefore reserve the right to make all such modifications as are included within the scope of the following claims or of mechanical equivalents to the structures set forth.

Having described my invention, what I claim, and desire to secure by Letters Patent, is—

1. The combination with an axle and its spindle portion, of sleeves concentric with the spindle and with each other one of the sleeves being provided with openings and elongated slots alternately arranged, balls and rollers in said openings and slots respectively, said rollers and balls contacting with the spindle and outer sleeve, and means on the spindle holding the sleeves against endwise motion.

2. The combination with the axle and its spindle portion, of sleeves concentric with the spindle and with each other, one of the sleeves being provided with openings and elongated slots alternately arranged, balls and rollers in said openings and slots respectively, said balls and rollers contacting through the openings and slots with the spindle and outer sleeve, said sleeves having annular heads at the ends said heads receiving the spindle, and means on the spindle engaging said heads.

3. The combination with an axle and its spindle portion, of a floating sleeve comprising an inner and an outer sleeve concentric with each other and each provided with openings which are coincident in the two sleeves, balls and rollers disposed between the two sleeves and projecting through the openings of each, an outer sleeve inclosing the floating sleeve, and means for engaging the ends of the sleeves, said means being sleeved on the spindle.

In witness whereof I have hereunto set my hand in the presence of two witnesses.

HEADLEY V. HILLCOAT.

Witnesses:
 A. J. CREUSE,
 H. R. McCLELLEN.